Patented Feb. 19, 1952

2,586,316

UNITED STATES PATENT OFFICE 2,586,316

3,3'-METHYLENEBIS(4-HYDROXYBENZENE-ARSONIC ACID) AND A METHOD FOR ITS PRODUCTION

Herman E. Faith, New Palestine, Ind., assignor to Allied Laboratories, Inc., Kansas City, Mo., a corporation of Delaware No Drawing. Application June 23, 1950,
Serial No. 170,035

3 Claims. (Cl. 260—442)

This invention relates to 3,3'-methylenebis(4-hydroxybenzenearsonic acid) and a method for its preparation.

My new compound can be employed as an agent for combatting coccidiosis. It is valuable in the preparation of more complex organic derivatives, and as a constituent of pharmaceutical preparations.

In carrying out the present invention, the following reactions are involved:

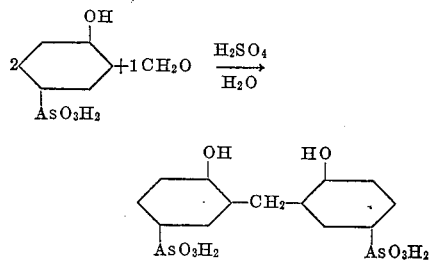

The invention is specifically illustrated by the following example—it being understood that the invention is not to be unduly limited thereby.

*Preparation of 3,3'-methylenebis(4-hydroxybenzenearsonic acid)*

To 177 g. of cold 92% sulfuric acid are added 45.6 g. of p-hydroxyphenylarsonic acid. The temperature is maintained at 0–5° C. while 8.7 ml. of 40% formaldehyde solution are added over a three-hour period. The reactants are kept cold for a total of twenty-four hours. The mixture is stirred during this time, and then it is poured into six times its volume of ice water. The precipitate is washed with cold dilute sulfuric acid, after it solidifies. It is dissolved in dilute sodium bicarbonate solution, stirred with activated charcoal and filtered. The filtrate is added with stirring to dilute hydrochloric acid, and the precipitate is collected by filtration. It is then recrystallized from dilute hydrochloric acid. It is insoluble in absolute ethanol, dry acetone, and glacial acetic acid, and it dissolves in dilute alkali. The decomposition point of 3,3'-methylenebis(4-hydroxybenzenearsonic acid) is above 300° C.

In the foregoing example, the 40% formaldehyde solution may be replaced with other substances yielding formaldehyde. Among such substances are included methylal, trioxane, and paraformaldehyde.

I claim:

1. The compound 3,3' - methylenebis(4 - hydroxybenzenearsonic acid).

2. The process for producing 3,3'-methylenebis(4-hydroxybenzenearsonic acid) which comprises condensing p-hydroxyphenylarsonic acid with a formaldehyde yielding substance in an acid medium.

3. The process for producing 3,3-methylenebis(4-hydroxybenzenearsonic acid) which comprises reacting p-hydroxyphenylarsonic acid with formaldehyde in aqueous sulfuric acid.

HERMAN E. FAITH.

REFERENCES CITED

The following references are of record in the file of this patent:

Chem. Ab., vol. 43, page 10167.
Chem. Ab., vol. 43, page 8615b.
See J. Pharmacol. and Exptl. Therap., 96, 238–49 (1949).
C. A., vol. 31, page 3902[8].
Richter, Textbook of Organic Chemistry, page 524, John Wiley & Sons Inc., 1938.